3,390,131
COPOLYESTER OF TRIS-HYDROXYALKYL
ISOCYANURATE
Gerald P. Roeser, Lahaska, Pa., assignor, by mesne assignments, to Mobil Oil Corporation, a corporation of New York
Filed Oct. 4, 1963, Ser. No. 313,934
4 Claims. (Cl. 260—75)

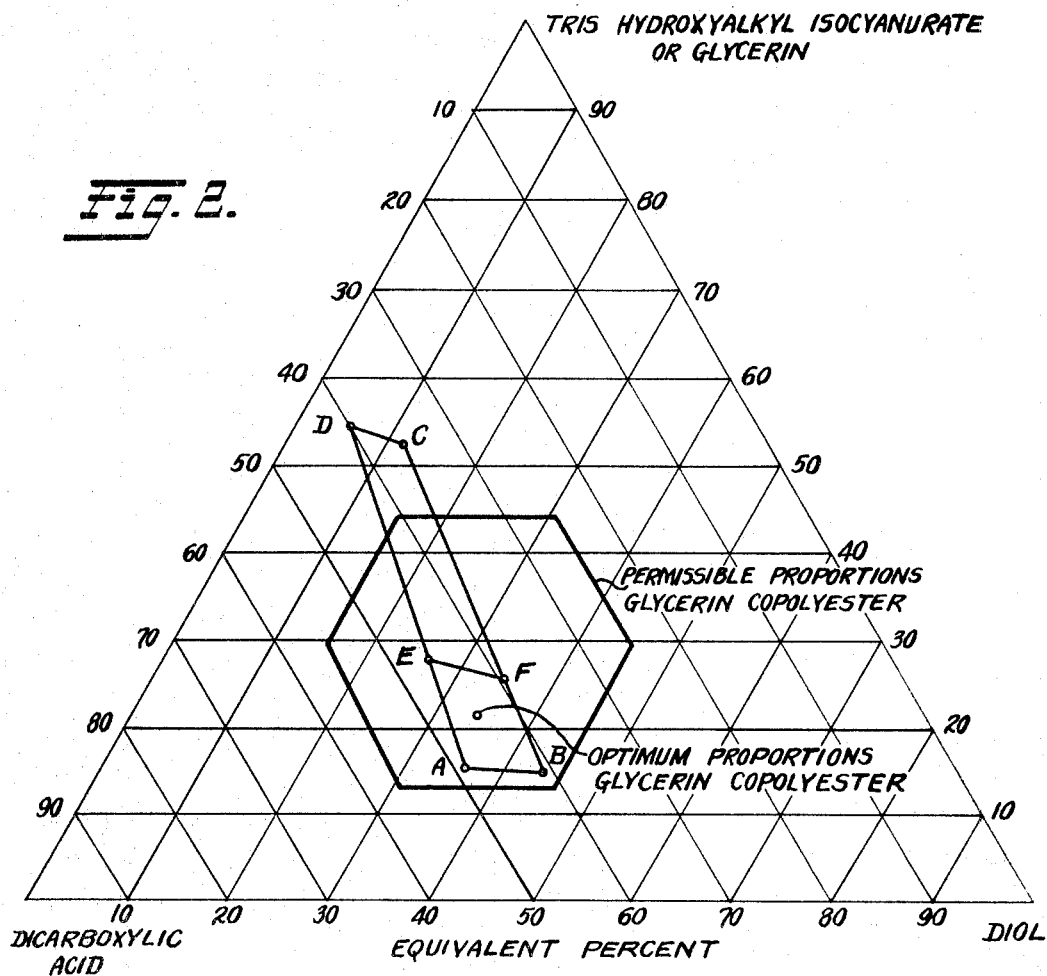
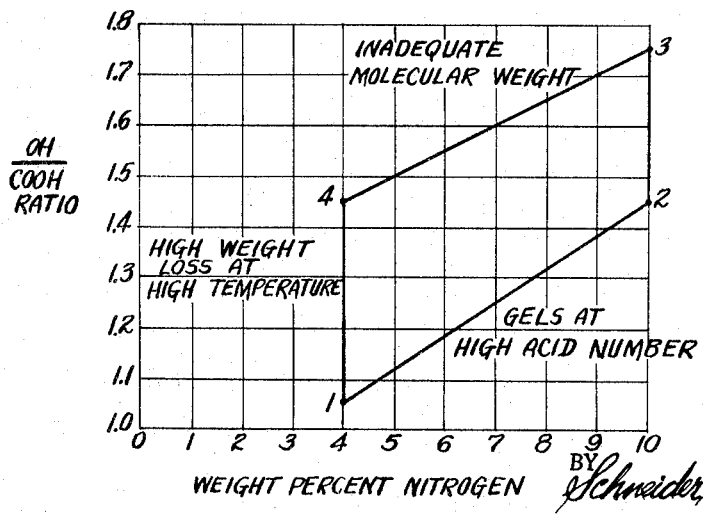

The present invention relates to organic solvent-soluble copolyester resins having improved resistance to elevated temperature exposure and useful in organic solvent solution coating compositions for the coating of wire and foil and particularly contemplates copolyesters based on tris-hydroxyalkyl isocyanurates.

The tris-hydroxyalkyl isocyanurates which may be used in the invention may be represented graphically by the formula:

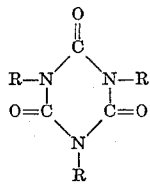

in which R represents a hydroxy alkyl radical containing at least two carbon atoms (i.e. 2-hydroxyethyl—

$CH_2CH_2OH$)

preferably two to four carbon atoms. The preferred isocyanurate is tris-2-hydroxyethyl isocyanurate. The isocyanurates and their production are more fully described in United States Patent No. 3,088,948, dated May 7, 1963, the disclosure of which is hereby incorporated by reference.

Analogous cyanurates are inoperative because they decompose under any esterification condition known to me.

It is known to form copolyesters from components tending to form linear, cold-drawable polymers, such as ethylene glycol and dimethyl terephthalate, and to modify these with glycerine to provide polymers with reasonably good resistance to heat, a high degree of organic solvent solubility, and pendant hydroxyl groups capable of cross-linking with isocyanates, anhydrides, epoxies, amino resins, etc. The performance of these modified, curable copolyesters at the higher operating temperatures now being used in electrical equipment is not commercially acceptable in many instances. Therefore, the achievement of improved heat resistance by the present invention is an important development in the art of wire and electrical foil enamels.

By comparing the heat resistance of the ethylene glycol terephthalate polyester with that of the ethylene glycol-glyceral terephthalate copolyester, one may deduce that the glycerine component is the source of heat stability, viz—

Percent weight loss at 550° F. after 54 hrs. (coatings baked 10′ at 500° F. on copper):
    Ethylene glycol/dimethyl terephthalate, mol ratio (1/1) _____ 39
    Ethylene glycol/glycerol terephthalate, mol ratio (.77/.33/1.0) _____ 49

NOTE.—Tests made in the absence of any curing agent.

Some limited improvement, 5 percent less weight loss in the previously mentioned test, in heat resistance is noted when the glycerine component in the copolyester is replaced with trimethylol ethane. The improvement, however, does not justify the added cost of the trimethylol ethane.

When the glycerine component was substituted by a tris-hydroxyalkyl isocyanurate, it was discovered unexpectedly that the high temperature resistance of the copolyester was significantly improved, viz—

Percent weight loss at 500° F. after 54 hrs. (coatings baked 10′ at 500° F. on copper):
    Ethylene glycol/glycerol terephthalate, mol ratio (.77/.33/1.0) _____ 49
    Ethylene glycol/tris(hydroxyethyl) isocyanurate/terephthalic acid, mol ratio (.620/.486/1.0) _____ 28

NOTE.—Tests made in the absence of any curing agent.

That this significant improvement was an unexpected result was corroborated when triethanolamine—which has the same hydroxyalkyl groups and a nitrogen atom but has no isocyanurate ring, as does tris-hydroxyethyl isocyanurate—was substituted for glycerine in the copolyester. The triethanolamine product led to even poorer heat resistance than that obtained with glycerine; 63 percent weight loss in 18 hours at 500° F.

Another feature of the invention is the discovery that the copolyesters containing the tris-hydroxyalkyl isocyanurate are thermally convertible per se. The following table shows the development of good solvent resistance by the isocyanurate-containing copolyester without the use of a modifying agent:

Resistance to p-chlorphenol: 10 minutes 100° C. (coatings baked 10′ at 500° F. on copper):
    Ethylene glycol/glycerine terephthalate (.77/.33/1.0 mol ratio) _____ Badly swollen.
    Ethylene glycol/tris(hydroxyethyl) isocyanurate/terephthalic acid, mol ratio (.620/.486/1.0) _____ No attack.

Since the isocyanurate modified polyester is thermally convertible per se, compounding and application of wire and foil enamels containing it are much simplified. Another advantage observed for the copolyester resins of the invention is the great reduction in product loss by evaporation in the curing towers or ovens. This loss consists of both the enamel solvent evaporated and the more volatile or labile portions of the polymers (including modifiers) present in the enamel. The loss tabulated below has been adjusted to show only polymer loss since solvent loss is equivalent for all three systems described.

Type wire enamel:              Percent stack loss
    Formvar phenolic _____ 7
    Ethylene glycol/glycerine terephthalate, mol ratio (.77/.33/1.0)+isocyanate, 85/15 weight ratio _____ 7
    Ethylene glycol/tris(hydroxyethyl) isocyanurate/terephthalic acid, mol ratio (.620/.486/1.0) (no external curing agent) _____ 2

The isocyanurate containing copolyesters differ markedly from glycerine or trimethylolethane copolyesters in that they apply to wire and electrical foil at substantially lower specific viscosities (sic. molecular weight) than in the case of the latter copolyesters. This is a direct result of the fact that all of the hydroxyls on the isocyanurate moiety react equally and permit the polyester to "grow" equally in three directions. The isocyanurate copolyesters also differ from conventional terephthalic type copolyesters in that they dissolve in low boiling solvents such as chloroform and dioxane, thus permitting spray application of finishes.

The usual method of making terephthalate copolyesters is to transesterify the polyol components with dimethyl terephthalate, usually in the presence of a transesterification catalyst like litharge or zinc oxide. And, indeed, ethylene glycol/tris (2-hydroxyethyl) isocyanurate terephthalate can be prepared by this route. When the isocyanurate component is used to make the copolyester, the preferable high-speed transesterification catalysts are titanium, antimony, bismuth and tin compounds.

When such isocyanurate-containing copolyesters are prepared from dimethyl terephthalate, the polyesters are terminated with ester groups, e.g., methyl groups from the dimethyl terephthalate. It would appear that these methyl groups are stripped off upon high temperature exposure, providing an opening for thermal decomposition to proceed.

It has been found that tris (2-hydroxyethyl) isocyanurate copolyesters can be prepared by direct esterification with terephthalic acid, under special conditions in accordance with the invention. When the acid is used, as for example, terephthalic acid, the copolyesters possess better high temperature properties because they are no longer terminated with ester groups. As the following table shows, the use of the diester such as dimethyl terephthalate for making copolyesters is not viewed as the equivalent of the use of the acid, such as terephthalic acid, viz—

Percent weight loss at 500° F. after 54 hrs. (coatings baked 10' at 500° F. on copper):
  Copolyester from dimethyl terephthalate _____ 51
  Copolyester from terephthalic acid _____ 28

NOTE.—Tests made in the absence of any curing agent. (Polyesters consist of 0.620/0.486/1.0 ethylene glycol, tris (2-hydroxyethyl) isocyanurate, and either dimethyl terephthalate or terephthalic acid, catalyzed with antimony oxide.)

The direct esterification of tris-hydroxyalkyl isocyanurate is not a simple matter. First, the compound tends to decompose at elevated temperatures and the decomposition is more extensive as both time of exposure to high temperature and temperature are increased. Indeed, the literature indicates decomposition at temperatures in excess of 180° C. and if one were to attempt a rapid direct esterification, one would expect to have to rely upon temperatures of at least about 200° C. for several hours.

Attempts to directly esterify tris-hydroxyethyl isocyanurate with terephthalic acid lead to failure. At a 1/3 molar ratio, 10% reaction gives a dark, cloudy and intractable mass. A 1/1 molar ratio permits a 50% reaction before gelatin. Use of litharge, antimony oxide or p-toluenesulfonic acid as catalyst failed.

It is also possible to use transesterification and this was tried using the diglycol ester of terephthalic acid and effecting the reaction with tris-hydroxyethyl isocyanurate using antimony oxide, a good transesterification catalyst. Such high temperatures (230–270° C.) were required to remove by-product ethylene glycol that the isocyanurate decomposed. It did not matter whether the diglycol ester was derived from terephthalic acid or dimethyl terephthalate.

It has been found to be possible to effect the direct esterification of tris (2-hydroxyethyl) isocyanurate under special conditions in accordance with the invention. If a diol (e.g., ethylene glycol) is used in conjunction with the polyol isocyanurate and the proportions between diol and triol carefully controlled and if the hydroxyl/carboxyl ratio (OH/COOH) is properly adjusted for the specific diol/triol ratio, direct esterification can be employed to prepare the superior copolyesters of the invention.

At any diol/triol proportion, if the OH/COOH is too high, the resin fails to advance adequately in molecular weight, resulting in poor application and inferior physical and electrical properties in the thermally converted film thereof. If the OH/COOH ratio is too low, the resin gels unpredictably and before the acid number of the product is adequately lowered.

The use of dimethyl terephthalate in place of terephthalic acid does not greatly alter the situation. If the ratio of components found to be effective in accordance with the invention is not used, then essentially the same failures take place using dimethyl terephthalate as take place using terephthalic acid and the proportion of tris-hydroxyethyl isocyanurate must be as defined herein in order to provide the improved resistance to elevated temperature which is the purpose of the invention. On the other hand, it is desired to stress that although the use of dimethyl terephthalate does not provide the exceptional heat resistance found to be possessed by terephthalic acid, the heat resistance is still quite good, being fully comparable with the ethylene glycol/glycerol terephthalate copolyester which is far better than conventional copolyesters having any significant degree of organic solvent solubility. Despite the very good heat resistance of the dimethyl terephthalate copolyester in accordance with the present invention, these copolyesters possess solubility in low boiling solvents which is not characteristic of the ethylene glycol/glycerol terephthalate copolyesters and, as a result, solutions adapted for the spray application of heat resistant copolyesters can be formulated in accordance with the invention while these could not be effectively formulated in the prior art. Also, and as noted hereinbefore, the isocyanurate-containing copolyester is capable of effective cure without the use of external modifying agents and this is not true of the ethylene glycol/glycerol terephthalate copolyester.

The tris (2-hydroxyethyl) isocyanurate-containing copolyesters of the present invention are limited to certain specific copolyesters to be defined hereinafter. The limitation is imposed by the achievement of improved heat resistance over the earlier mentioned glycerine-containing copolyester. As the following table shows, isocyanurate-containing copolyesters having four to ten percent nitrogen content are preferable. As the nitrogen content exceeds 4% by weight, improvement over glycerine is noted, and significant improvement is exerted at nitrogen contents of 6% and higher. At 10% nitrogen, the isocyanurate content becomes so high and the diol content so low, the polyesters become difficult to prepare and this represents a practical limit as to the amount of isocyanurate to be incorporated into the copolyester by direct esterification.

| Percent Nitrogen in Isocyanurate Copolyester | Percent Weight Loss at 500° F. | |
|---|---|---|
| | 18 hours | 168 hours |
| 2 | 20 | 80 |
| 4 | 20 | 79 |
| 6.9 | 9 | 64 |
| 10.0 | 6 | 44 |
| (1) | 20 | 76 |

¹ Ethylene glycol/glycerol terephthalate mole ratio (.77/.33/1.0).

For the nitrogen content range of 4 to 10%, it is possible to vary the diol to triol ratio in the copolyester for various OH/COOH ratios. At any specific diol to triol ratio, the OH/COOH proportion will determine the molecular weight and the acid number of the copolyester prepared by direct esterification. The closed area 1–2–3–4–1 of FIG. 1 describes the OH/COOH ratios which are useful.

The copolyesters of the invention contain three essential components. The first component is an aromatic dicarboxylic acid, a term intended to broadly denote the use of acids, anhydrides, or their corresponding esters and diesters. The preferred acids are those which, with ethylene glycol, have the capacity of forming high molecular weight, cold-drawable homopolyesters. The acids which are particularly preferred are selected from the group of isophthalic acid, terephthalic acid, benzophenone dicarboxylic acid, and mixtures thereof. Benzophenone dicarboxylic acid has the formula:

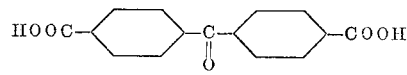

The second essential component of the copolyester is aliphatic diol containing from 2–10 carbon atoms. Various aliphatic hydrocarbon diols may be used, including cycloaliphatic diols, the preferred diol being ethylene glycol. 1,4-butane-diol; 1,5-pentanediol; and 1,4-butene-2-diol illustrate other preferred diols for use alone or together with ethylene glycol. Other diols which may be used are illustrated by 1,2-propanediol; 1,3-propanediol; 1,6-hexanediol; 1,3-cyclobutane diol; 1,4-cyclohexane diol; 1,4-cyclohexane dimethanol, etc. The preferred diols are straight chain diols having from 2–5 carbon atoms and two primary hydroxy groups.

The third essential component of the copolyester is tris-hydroxyalkyl isocyanurate as previously defined.

The copolyesters of the invention consist essentially of the three components identified hereinbefore and the proportions of these components are critically inter-related. From the broad standpoint, the copolyesters consist essentially of:

(A) From 36–49 equivalent percent of the defined dicarboxylic acids or their esters;

(B) From 6–43 equivalent percent of the defined aliphatic diols; and (C) From 15–54 equivalent percent of tris-hydroxyalkyl isocyanurate.

The above broad indication of proportions is not adequate to identify the components which are used in the invention and the only feasible way of accurately defining proportions is graphically. This technique has been adopted in the triangulation presented herewith (FIG. 2) in which the effective proportions in accordance with the invention are defined as falling within the closed area A–B–C–D–A. The accompanying triangulation includes an indication of the proportions which have been taught to be useful in the production of copolyesters for wire coating purposes from ethylene glycol, glycerin and dimethyl terephthalate. It will be seen from the triangulation that the proportions useful in the invention fall within a very narrow range and only a portion of this range coincides with some of the proportions previously contemplated for the glycerin system. The triangulation further shows the proportions previously found to be optimum for the glycerin system, and it will be seen that the proportions which are preferred in the present invention and which fall within the closed area E–F–C–D–E do not coincide with those previously found to be optimum. The line E–F denotes copolyesters containing about 6% nitrogen by weight.

A portion, up to about 50% by weight, of the tris-hydroxyalkyl isocyanurate component, can be constituted by any polyhydric alcohol having at least three hydroxyl groups, such as glycerin; pentaerythritol; 1,1,1-trimethylolethane; 1,1,1 - trimethylolpropane; sorbitol; mannitol; dipentaerythritol; diglycerol, etc., but this is not preferred since, and despite the economy of using glycerin, these polyhydric alcohols have been found to be detrimental to high temperature resistance.

The term "equivalent percent" designates the percentage computed for each reaction in accordance with the formula:

Equivalent percent of reactant=
$$\frac{100 \times \text{equivalents of reactant}}{\text{total equivalents}}$$

in which the number of equivalents of any reactant is the number of moles of the reactant multiplied by the number of functional groups present in the reactant, e.g., 2 for phthalic acid, 2 for ethylene glycol and 3 for tris-hydroxyalkyl isocyanurates.

While the use of acids in the polyesterification reaction is preferred, the corresponding esters and diesters, such as dimethyl terephthalate, are included, the reaction then being by transesterification to produce a useful product within the invention, though a specifically different product as previously indicated. Indeed, a feature of the invention is the finding that the polyesters produced from the acids are superior in their high temperature properties to those produced from the diesters by transesterification, e.g., from dimethyl terephthalate. While the acid copolyesters are very different in their high temperature properties from the ester-based copolyesters as has been noted, these specifically different copolyesters share the common desirable property of good solubility in low boiling solvents enabling economies in solvent utility and the potential for spray application.

The copolyesters found to be useful in accordance with the invention have a specific viscosity (relative viscosity minus 1.0) measured at 77° F. in a 1 gram per deciliter solution in a solvent mixture containing 60 parts of phenol to 40 parts of tetrachlorethane in the range of from about 0.10–0.70. It has been found that from the standpoint of overall properties, it is preferred to employ copolyesters having a specific viscosity as indicated hereinbefore in the range of from 0.15–0.30.

Relative viscosity is determined in an Ostwald-Fenske viscosimeter and is computed as follows:

$$\text{Relative viscosity} = \frac{\text{Solution efflux time}}{\text{Solvent efflux time}}$$

The relative viscosity is thus obtained by direct measurement. Specific viscosity may be derived by subtracting 1.0 from the relative viscosity.

Having defined the proportions of the various components which are essential to the copolyester, the present invention includes the finding that direct copolyesterification can be effected in a single stage reaction conducted in the pressure of effective esterification catalysts at temperatures in the range of from 200 up to about 230° C.

The high temperature catalyzed reaction is essential for, otherwise, the reaction mixture must be maintained at a temperature in excess of the decomposition temperature of the isocyanurate for an excessive length of time. It is preferred, in accordance with the invention, to obtain yields which are approximately stoichiometric within a period up to about 8 hours, preferably 4–6 hours. If the reaction does not proceed this quickly, then the extent of decomposition and inter-molecular cross-linking which takes place is excessive, or resin production must be stopped at an inadequate yield, or before the reaction has proceeded to provide a sufficiently lowered acid number.

In accordance with the invention, the acid number should be lowered below about 30, preferably below 20.

In the presence of an effective esterification catalyst, illustrated by 0.25% by weight of total reactants of antimony trioxide, a reaction temperature in the range of 220–230° C. is preferred for periods of time up to about 7 hours. It will be understood, however, that once the copolyester has been formed, the isocyanurate is combined into a stable product so that its decomposition rate is no longer controlling.

In addition to the use of reaction temperatures within the range of from 200 up to about 230° C., in the presence of an effective esterification catalyst so that the reaction may be essentially completed within a period of up to about 8 hours, it is also important to employ critical proportions as previously indicated and to maintain the materials in their respective proportions in the system. Thus, ethylene glycol is volatile and care must be taken to minimize the proportion of glycol hold-up in the condenser column used to separate the glycol from the water of esterification; the glycol being returned to the reactor and the water of esterification passing through as a vapor to be condensed and collected in a distillate receiver. Best results are achieved at minimum permissible proportions of hydroxy-containing component (the glycol and the isocyanurate). If an excessive proportion of glycol is retained in the column, then the product tends to gel rapidly and unpredictably.

It is helpful, though not essential, to further speed the reaction by using a nitrogen sparge to assist in the removal of water from the reaction mixture.

Removal of esterification water by means of vacuum or an azeotroping solvent is contemplated as long as the glycol vapors are returned by fractionation to the reactor.

As previously indicated, the direct esterification reaction under consideration tends to run away to produce valueless gels. Since the reaction is conducted at very high temperature in a molten mass, the resinous reaction product is desirably dissolved out of the reactor. When solvent is introduced into the molten mass in order to dissolve the same, there is a tendency for the solvent to azeotrope water out of the system to further advance the copolyester and cause its gelation. This tendency for solvent advance at high temperature is minimized in accordance with the invention by the use, as solvent, of alkylated phenols which may be used alone or in various commercial mixtures known as cresylic acid. Various commercial mixtures of cresols may be used, a typical mixture being set forth in Example 1. Or the resin may be discharged, allowed to cool and solidify. The solid resin may then be ground and used for making solutions or dispersions or flours for powder coating.

Numerous esterification catalysts are usable to facilitate the direct esterification under consideration. The metal catalysts which are useful are generally effective in the range of from 0.01–5%, but from 0.1% to 1%, based on the total weight of reactants, is generally preferred. These are illustrated by titanium metal powder (325 mesh); isopropyl titanate; stearyl titanate; hydroxymonostearyl titanate polymer; titanium chloride acetylacetonate; reaction product of 1 mole trimethyl-benzyl ammonium hydroxide with 1 mole isopropyl titanate; reaction product of 1 mole sodium methylate with 1 mole isopropyl titanate; reaction product of 2 moles sodium methylate with 1 mole isopropyl titanate; stannous oxide; tin oxalate; dibutyl tin oxide; tributyl tin oxide; dibutyl tin diacetate; antimony oxide ($Sb_2O_3$); bismuth hydroxide, lithium acetate; cobalt octoate; nickel acetylacetonate; molybdenum trioxide; tungstic acid; etc.

To illustrate the production of copolyesters in accordance with the invention, a series of copolyesters was prepared containing ethylene glycol, tris(2-hydroxyethyl) isocyanurate and terephthalic acid in molar proportions of 0.620/0.486/1.0 as indicated in the following table.

TABLE 1

| Percent Catalyst | Reaction Hours | Reaction Temp. ° C. | Acid Value | Esterification [1] |
|---|---|---|---|---|
| None | 7.3 | 224–231 | 18 | [2] 76 |
| 0.25% Stannous oxide | 5.3 | 217–229 | 24 | 98 |
| 0.25% Antimony trioxide | 5.5 | 214–231 | 25 | 100 |
| 0.25% Isopropyl titanate | 8.0 | 204–231 | 18 | 100 |
| 0.25% Bismuth hydroxide | 9.0 | 212–231 | 27 | 100 |

[1] Percent theoretical water of esterification recovered.
[2] Gelled.

The reactions were conducted as reported hereinafter in Example 1. Tin(ous) oxide and antimony trioxide were very fast and superior to all other systems. Isopropyl titanate was next in activity, followed by bismuth hydroxide. When no catalyst was present, esterification did proceed, but so did the breakdown of the isocyanurate so that the batch gelled, even at 76% conversion.

The production of a preferred copolyester is as follows:

EXAMPLE 1

In a 72-liter 3-necked flask equipped with a powerful stirrer through the center neck, a thermometer in one side well, and on the other side well a steam-heated 40-inch Allihn condenser leading to a water-cooled condenser and receiver for collecting the water of esterification, there are charged 2880 g. (46.5 moles) ethylene glycol, 9525 g. (36.5 moles) tris (2-hydroxyethyl) isocyanurate, and 12,450 g. (75.0 moles) terephthalic acid. If catalyst is to be used, 62 g. (0.25%) of antimony oxide is added. The ingredients are heated with agitation to about 200° C. in ninety minutes. Water and glycol reflux in the steam jacketed condenser with the glycol returning to the pot and the water volatilizing over into the receiver. After 5 to 9 hours of heating, not exceeding 220–230° C. pot temperature, all the water of esterification which will develop is recovered—2575–2640 g. or 95.3–97.8% of theory. The acid value is checked by titrating a sample of the resin melt dissolved in pyridine with 0.01 N potassium hydroxide solution to the phenolphthalein end point. According to the OH/COOH ratio used, it can vary up to 30, but in the above batch is about 5.0. A sample of the melt is dissolved in 60/40 phenol/tetrachlorethane at a concentration of 1 gram per deciliter and the specific viscosity determined at 77° F. It may vary from 0.10 to 0.70 according to the OH/COOH ratio and final acid value selected. In this case it is 0.22. 22,215 g. of cresylic acid (see Note 1) are added to the hot resin and the solution discharged. Solids of the solution are determined, usually 51–53%, and a sample is diluted with 60/40 phenol/tetrachlorethane to a concentration of 1 g. per deciliter. Specific viscosity is again determined and comes out to 0.23.

This copolyester had a OH/COOH ratio of 1.35/1.00 and a theoretical nitrogen content of 6.91%.

Note 1

Solvent composition of:

| | Weight percent |
|---|---|
| Phenol | 44 |
| o-Cresol | 14 |
| m-Cresol | 13 |
| p-Cresol | 5 |
| Mixed xylenols | 24 |

EXAMPLE 2

In a 5-liter 3-necked flask equipped with a powerful stirrer through the center neck; a thermometer in one side well, and on the other side well a 300 mm. Vigreaux column leading to a water-cooled condenser and receiver for collecting the methanol of transesterification, there are charged 280 g. (4.52 moles) ethylene glycol, 879 g. (3.37 moles) tris (2-hydroxyethyl) isocyanurate, 1280 g. (6.6 moles) dimethyl terephthalate, and 122 g. of aliphatic petroleum naphtha (see Note 2). The petroleum naphtha is used to suppress the sublimation of the dimethyl terephthalate component during the transesterification procedure. 6.1 g. (0.25%) of antimony oxide is used as transesterification catalyst. The ingredients are heated with agitation to 161° C. in 60 minutes. Methanol and said petroleum naphtha reflux in the Vigreaux column with the naphtha returning to the pot and the methanol distilling over into the receiver. After 9 hours of heating, not exceeding 205° C. pot temperature, all the methanol which will develop is recovered—422 g. or 100% of theory. The acid value is checked by titrating a sample of the resin melt dissolved in pyridine with standard alkali. Since free acid was not used in the preparation, it is low: 3.3. A sample of the melt is also dissolved in 60/40 phenol-tetrachlorethane at a concentration of 1 gram per deciliter and specific viscosity determined at 77° F. A value of 0.26 is obtained. 1900 g. of cresylic acid (see Note 1 above) are added to the hot resin and the solution discharged. It contained 49.5% solids in a 6/94 ratio of said petroleum naphtha/cresylic acid. The specific viscosity of the resin in the solution is found to be 0.24.

This copolyester had a $OH/COOCH_3$ ratio of 1.45/1.00 and a theoretical nitrogen content of 7.0%.

Note 2

Data identifying the aliphatic petroleum naphtha is as follows:

| | |
|---|---|
| API gravity @ 60° F. | 49.1 |
| Specific gravity @ 60° F. | 0.7835 |
| Wt./gal. (lb.) | 6.52 |
| Distillation, IBP, ° F. | 364 |
| 50% | 375 |
| Dry end point, ° F. | 399 |
| Final end point, ° F. | 403 |
| Flash Point, ° F.: | |
| Tag, closed cup | 142 |
| Kauri-butanol, cc. | 32.3 |
| Aniline cloud pt., ° F. | 150 |

The copolyesters of the present invention are thermally convertible per se, with or without modifying agents, but desirably in the presence of a dissolved metal catalyst such as zinc, aluminum, magnesium or copper.

Metal catalysts which may be used in an amount of 0.75% based on the weight of the coating composition are illustrated by the octoates of zinc, aluminum, magnesium and copper. Additionally, modifying agents such as toluene sulfonic acid, N-benzyl trimethyl ammonium methoxide and various phenolic resins are appropriate for use in the invention, if desired.

It will be understood that the invention is not limited to the specific formulas and ingredients recited in the foregoing examples and that pigments, dyes, waxes and other similar ingredients may be added to the otherwise clear compositions to provide decorative and similar effects without departing from the scope of the invention.

The invention is defined in the claims which follow:

1. An organic solvent soluble thermally convertible copolyester possessing improved elevated temperature exposure resistance and consisting essentially of the copolyesterification reaction product of:
   (A) aromatic dicarboxylic acid consisting essentially of terephthalic acid;
   (B) aliphatic diol containing from 2–10 carbon atoms; and
   (C) tris-hydroxyalkyl isocyanurate;
   the equivalent proportions of said components (A), (B) and (C) being defined by the closed area E–F–C–D–E in the accompanying triangulation, said copolyester having a specific viscosity in the range of from 0.15 to 0.30, viscosity being measured at 77° F. in a 1 gram per deciliter solution in a solvent mixture of 60 parts of phenol to 40 parts of tetrachlorethane.

2. The copolyester of claim 1 in which said diol is ethylene glycol.

3. The copolyester of claim 1 in which said isocyanurate is tris-2-hydroxyethyl isocyanurate.

4. The copolyester of claim 1 in which said copolyester has an acid number of less than 30.

References Cited
UNITED STATES PATENTS

| | | | |
|---|---|---|---|
| 3,211,585 | 10/1965 | Meyer et al. | 260—75 |
| 3,205,200 | 9/1965 | Bunge et al. | 260—75 |

WILLIAM H. SHORT, *Primary Examiner.*

R. L. LYON, *Assistant Examiner.*